United States Patent
Jansen

(10) Patent No.: US 9,393,741 B2
(45) Date of Patent: Jul. 19, 2016

(54) PROCESS FOR PRODUCING A REINFORCED PLASTIC ARTICLE

(71) Applicant: Thomas GmbH + Co. Technik + Innovation KG, Bremervorde (DE)

(72) Inventor: Klaus Jansen, Buxtehude (DE)

(73) Assignee: Thomas GmbH + Co. Technik + Innovation KG, Bremervorde (DE)

( * ) Notice: Subject to any disclaimer, the term of this patent is extended or adjusted under 35 U.S.C. 154(b) by 152 days.

(21) Appl. No.: 14/354,951

(22) PCT Filed: Oct. 19, 2012

(86) PCT No.: PCT/EP2012/004389
§ 371 (c)(1),
(2) Date: Apr. 29, 2014

(87) PCT Pub. No.: WO2013/064216
PCT Pub. Date: May 10, 2013

(65) Prior Publication Data
US 2014/0284843 A1     Sep. 25, 2014

(30) Foreign Application Priority Data
Nov. 1, 2011   (DE) .......................... 10 2011 117 296

(51) Int. Cl.
*B29C 70/02*     (2006.01)
*B29C 70/52*     (2006.01)
(Continued)

(52) U.S. Cl.
CPC ............. *B29C 70/028* (2013.01); *B29C 47/122* (2013.01); *B29C 70/523* (2013.01); *B29C 70/526* (2013.01); *B29L 2023/00* (2013.01)

(58) Field of Classification Search
CPC .. B29C 70/521; B29C 70/522; B29C 70/523; B29C 70/524; B29C 70/52; B29C 70/526; B29C 70/527; B29C 47/122; B29D 23/001
See application file for complete search history.

(56) References Cited

U.S. PATENT DOCUMENTS

| 3,391,422 A | 7/1968 | Boggs | |
|---|---|---|---|
| 3,966,388 A * | 6/1976 | Bonavent et al. | ....... B29C 53/12 425/150 |
| 2009/0206515 A1* | 8/2009 | Jansen | .................. B29C 70/525 264/257 |

FOREIGN PATENT DOCUMENTS

| CN | 101334122 A | 12/2008 |
|---|---|---|
| CN | 101641205 A | 2/2010 |

(Continued)

OTHER PUBLICATIONS

WIPO/PCT, International Search Report for parent application PCT/EP2012/004389 (Sep. 27, 2013).

(Continued)

*Primary Examiner* — William Bell
(74) *Attorney, Agent, or Firm* — Laurence P. Colton; Smith Tempel Blaha LLC

(57) ABSTRACT

Plastics articles with continuous reinforcement strands are normally produced by pultrusion. Pultrusion methods are known for producing straight or curved plastics profiles. It has not hitherto been possible for reinforced plastics articles of more complex form to be produced by pultrusion methods. The invention provides a pultrusion method in which a part of a curved plastics article serves, together with a mold (15), for the pultrusion of a reinforced plastics article. In this way, it is possible for complex plastics articles, for example a plastics pipe (10), to be produced by pultrusion.

21 Claims, 10 Drawing Sheets

(51) Int. Cl.
*B29C 47/12* (2006.01)
*B29L 23/00* (2006.01)

(56) References Cited

FOREIGN PATENT DOCUMENTS

FR  2401760 A1 * 3/1979 ................ B21F 3/04

WO  2008/116560 A1  10/2008

OTHER PUBLICATIONS

State Intellectual Property Office of the People'S Republic of China, Notification of the First Office Action (on a related case), Sep. 6, 2015.

* cited by examiner

PROCESS FOR PRODUCING A REINFORCED PLASTIC ARTICLE

STATEMENT OF RELATED APPLICATIONS

This patent application is the US National Phase of International Application No. PCT/EP2012/004389 having an International Filing Date of 19 Oct. 2012, which claims priority on German Patent Application No. 10 2011 117 297.7 having a filing date of 1 Nov. 2011.

BACKGROUND OF THE INVENTION

1. Technical Field

The invention relates to a method for producing a reinforced plastics article, wherein a continuous reinforcement composed of strands, fabric and/or the like is guided through a mold and, in the mold, is embedded in plastic, and the mold is periodically moved relative to the preferably static plastics article, and a method for producing a reinforced plastics article, wherein a continuous reinforcement composed of strands, fabric and/or the like is guided from a material supply through a mold and, in the mold, is embedded in plastic, the mold is periodically moved relative to the plastics article and a gripper is periodically moved on the plastics article relative to the mold.

2. Prior Art

Plastics articles, in particular plastics profiles, with a continuous reinforcement composed of strands, fibers, fabrics and/or knits embedded in preferably thermosetting plastic are predominantly produced in continuous form as a plastics strand or are formed from at least one plastics strand. This is preferably performed using the pultrusion method. For this purpose, the reinforcement is guided through a mold, and in the mold, the reinforcement is embedded in the liquid plastic. The mold yields an at least partially hardened plastics strand with the profile predefined by the mold.

The pultrusion method is normally used to produce straight strand-like plastics profiles. Pultrusion methods are however also known which make it possible to produce curved plastics profiles as plastics strand profiles. With regard to the complexity of curved plastics profiles in particular, known pultrusion methods reach their technical limits. As a result, it has hitherto only been possible to a limited extent for technically complex plastics articles to be produced by pultrusion methods.

BRIEF SUMMARY OF THE INVENTION

The invention is now based on the object of providing a method with which complex reinforced plastics articles can be produced in particular by pultrusion methods.

A method for achieving said object is a method for producing a reinforced plastics article, wherein a continuous reinforcement composed of strands, fabric and/or the like is guided through a mold and, in the mold, is embedded in plastic, and the mold is periodically moved relative to the preferably static plastics article, characterized in that a part of the curved plastics article contributes, together with the mold, to the formation of the plastics article. By virtue of the fact that, according to said method, provision is made for the mold and a part of the already manufactured plastics article to be used in the molding process for the formation of the plastics article, it is possible to form plastics articles whose overall form differs from the pultruded plastics strand profile. These may be plastics profiles of a form more complex than that of the respectively pultruded plastics strand.

The method is preferably configured such that a pipe-shaped plastics article is formed from multiple windings lined up in coiled or spiral fashion. The windings are pultruded as a continuous reinforced plastics strand, wherein the cross section of the windings is predefined both by the mold and by a part of the already produced plastics article. It is preferable for an already formed (preceding) winding to be used, together with the mold, for forming, in particular pultruding, the subsequent winding. As a result, the mold does not need to completely surround the winding pultruded in strand-like fashion, which makes it possible for the plastics article to be formed from contiguous and preferably interconnected windings. The windings are connected to one another at a location or wall of the subsequent winding part to be produced which is influenced in terms of shaping not by the mold but by the preceding winding. In this way, the windings can be fixedly and permanently connected, specifically fused, during the pultrusion process.

As a result of the formation of the plastics article from contiguous spiral-shaped windings, there is formed by means of the mold during the pultrusion process a reinforced plastics strand which runs in spiral fashion owing to a corresponding curvature of the mold in the production direction of the plastics strand. It is preferably provided here that the axis about which the winding of the plastics article runs in spiral fashion coincides with a longitudinal central axis of the overall plastics article to be produced, in particular of a pipe-shaped plastics article. A rigid plastics pipe or a plastics pipe that is flexible within certain limits or a plastics hose is thus generated.

It is preferably provided that the mold is open on one side and performs a relative movement on a part of the preceding winding and of the subsequent winding of the plastics article. The preceding, already previously produced winding accordingly serves not only for forming a delimitation of the subsequent winding on one side at the side left open by the mold but also for guiding, in particular, the subsequent winding to be produced. It is achieved in this way that the subsequent winding corresponds in terms of its curvature to the preceding winding.

It is also preferably provided that the periodic relative movement of the mold with respect to the plastics article takes place in such a manner that the mold is moved periodically on and along the profile of the winding, which is to be produced, of the plastics article, specifically in particular relative to the plastics article or winding that is static in this case. During said periodic movement of the mold, the plastics part, in particular a part of the preceding, finished winding, is held static. This may be realized in a variety of ways, for example by means of a gripper, clamps or the like. Provision is preferably made for the mold to be moved back and forth in discontinuous or stepped fashion, wherein, during the backward movement of the mold counter to the pultrusion direction, the mold performs a relative movement on a part of a winding of the plastics article. In this way, gradually in the manner of a pilgering process, a piece of a winding is pushed out of the mold in the pultrusion direction, specifically preferably after the respective part of the winding has solidified or hardened in the mold at least to such an extent as to be adequately stable.

It is also provided that, during the periodic backward movement, counter to the pultrusion direction, of the mold on the winding of the plastics article, the plastics article is held static, for example by a gripper, preferably in the region of an already produced preceding winding. In this way, with the preceding winding held fixed, a part of the subsequent winding can be pulled out of the mold. Thereafter, the gripper is opened again, that is to say released from the winding. The gripper is then moved in front of the mold again counter to the pultrusion direction, and then the mold with the gripper together with the winding is moved forward by a short distance in the pultrusion direction, wherein the already produced part of the plastics article is rotated about its longitudinal central axis.

A further method for achieving the object mentioned in the introduction is a method for producing a reinforced plastics article, wherein a continuous reinforcement composed of strands, fabric and/or the like is guided from a material supply through a mold and, in the mold, is embedded in plastic, the mold is periodically moved relative to the plastics article and a gripper is periodically moved on the plastics article relative to the mold, characterized in that the mold, the gripper and the material supply are moved periodically around a shell surface of a cylindrical core, wherein the gripper and the material supply are moved jointly, in a fixed relationship, periodically around the shell surface. According to said measures, the mold, the at least one gripper and the material supply can be moved around the core in order to produce the plastics article. As a result, for the production of the plastics article, the core does not need to be moved, in particular does not need to be rotated. This makes it possible in particular for the plastics article to be produced around large cores. The core may be removed after the production of the plastics article. Provision is however preferably made for the plastics article to be left on the core, that is to say for an article to be provided which has a plastics article arranged around it, wherein the plastics article remains fixedly and permanently connected to the core. Provision is preferably made for the at least one gripper and the material supply to always be moved jointly and simultaneously around the core. By contrast, the mold is moved separately from and independently of the at least one gripper and the material supply. By virtue of the fact that the at least one gripper and the material supply are moved simultaneously, the strands, fabrics or the like that serve for the reinforcement of the plastics article are not, when pulled through the mold, stretched to such an excessive extent that they concentrate at particular locations in the mold; in fact, the strands instead maintain the intended relative position within the mold.

Provision may also be made for a spiral-shaped plastics article with windings preferably spaced apart from one another to be produced around the preferably static core. The plastics article accordingly forms a spiral of reinforced plastic surrounding the core at the outside. Said spiral may serve for the reinforcement and/or protection of the core, wherein said spiral is flexible when the windings are spaced apart from one another. The core may be a pipe composed of various materials, for example metal or plastic, or else may be a hose, a line, a cable or the like which is reinforced by the external spiral-shaped plastics article.

In a preferred refinement of the invention, provision is made for the windings of the preferably spiral-shaped plastics article to have their form or shape imparted to them both by the mold and also by the shell surface of the cylindrical core. The mold therefore surrounds the profile of the respective winding only partially, specifically from three or only two sides. A side of the winding that bears against the core is formed or shaped by the cylindrical shell surface of said core. Here, the core may bear the windings of the plastics article and be connected by fusion or adhesive bonding to the cylindrical shell surface.

Provision is preferably made for the mold, the gripper and the material supply to move on a spiral path around the shell surface of the cylindrical core. The spiral-shaped winding of the plastics article around the core is generated by means of an advancing movement of the mold, of the at least one gripper and of the material supply in the longitudinal direction of the core. By means of a corresponding advancing movement of the mold, of the at least one gripper and of the material supply in the longitudinal direction of the core, it is possible for the individual windings of the plastics article to have any desired spacing from one another without these making contact with one another.

A further advantageous refinement of the method provides for the gripper and the material supply to be moved jointly in stepped, that is to say discontinuous fashion relative to the mold and the cylindrical core on the spiral path around the core. Here, in at least one production phase of the plastics article, the mold is static relative to the gripper and the material supply. The mold then also does not move relative to the cylindrical core. In this way, the relative spacing to the gripper and to the material supply remains constant as a result of joint movement and joint standstill phases. By contrast, the mold can be periodically moved relative to the core and relative to the windings of the plastics article to be produced. In one production phase of the plastics article, said relative movement of the mold with respect to the windings of the plastics article may take place in standstill phases of the gripper and of the material supply. In particular, for demolding of a part of a winding, the mold is moved backward relative to the winding and relative to the core counter to the pultrusion direction while the gripper and the material supply remain static.

In another preferred refinement of the method, provision is made for the at least one gripper to be arranged directly in front of the mold as viewed in the pultrusion direction of the plastics article or along the windings. Here, the spacing between the gripper and the mold can be varied by alternating movement of the mold or of the gripper with the material supply, in particular for the ejection of a newly produced hardened section of the winding from the mold.

In another refinement of the method, it is conceivable for a spacer material, in particular a spacer or spacer strip, to be provided between the individual successive windings of the plastics article. In particular, during the production of the plastics article with continuous formation of the windings, a continuous spacer strip can be inserted continuously between two successive windings. As a result, the windings do not make contact even though they are situated in close succession. The windings are separated from one another only by the preferably thin spacer strip. The spacer strip has the effect that a preceding winding, during the shaping of the side or wall, abutting against said preceding winding, of the winding to be produced subsequently, can be demolded by virtue of the fact that said side or wall is molded onto the exposed side of the spacer strip. Owing to the spacer strip, the hose-like or pipe-shaped plastics article encasing the core can be flexibly deformed despite the adjacent successive windings making contact with both sides of the spacer strip. This is the case in particular if the spacer strip is composed only of a, for example, siliconized material or is provided with siliconized surfaces which prevent adhesion of the walls of successive windings to the spacer strip.

Further advantageous refinements of the method for producing the spiral-shaped plastics article, or plastics article composed of windings, will emerge from the subclaims.

BRIEF DESCRIPTION OF THE DRAWINGS

Preferred methods according to the invention will be explained in more detail below on the basis of the drawing, in which.

DETAILED DESCRIPTION OF PREFERRED EMBODIMENTS

Figure 1:
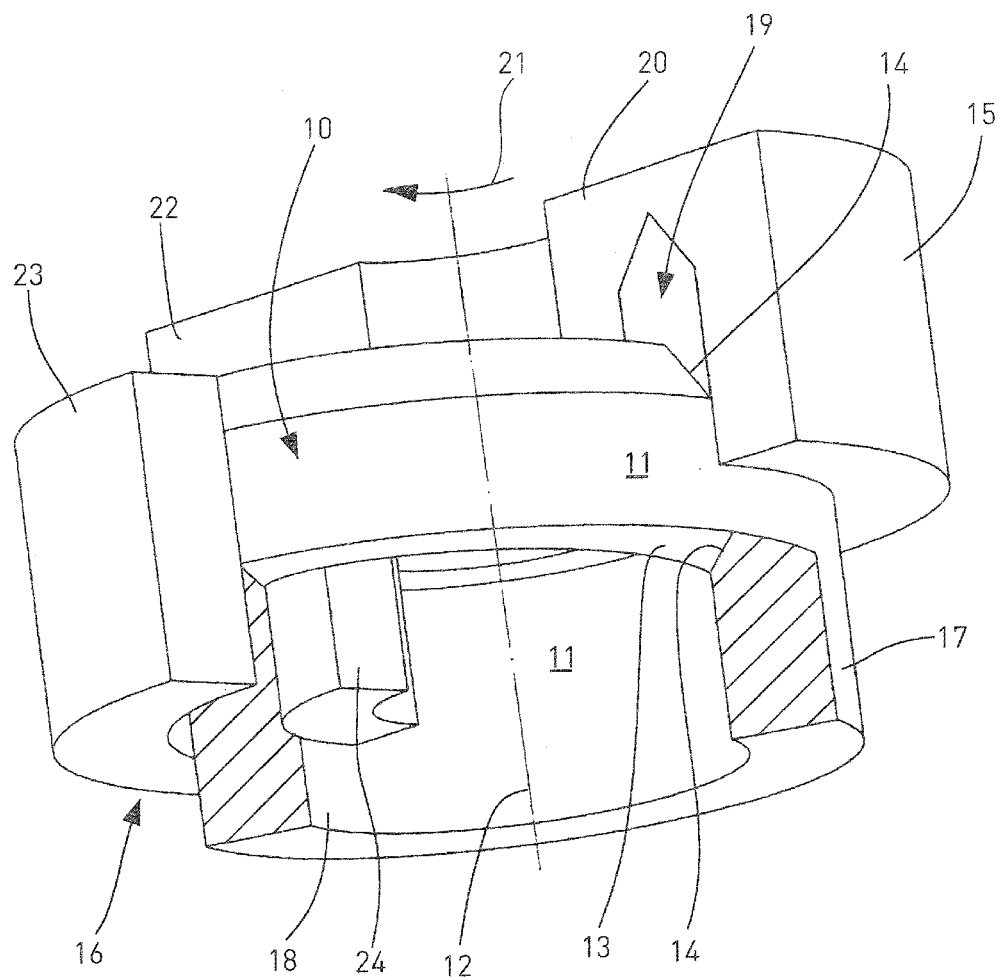
FIG. 1 is a schematic illustration of a part of a device for producing a plastics article.
Figure 2:
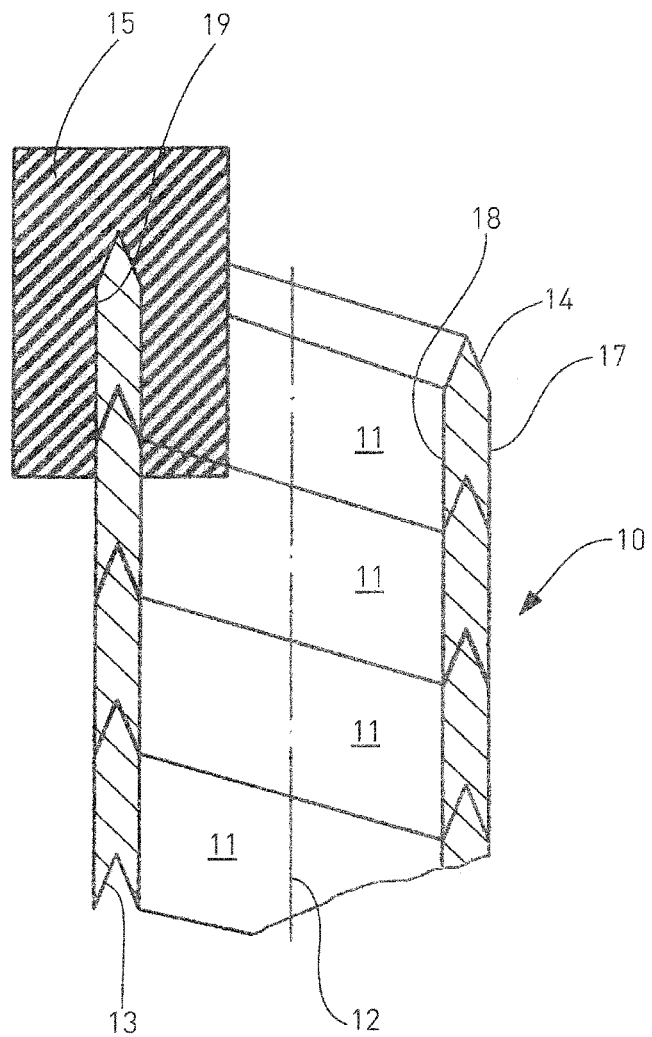
FIG. 2 shows a longitudinal section through a part of the plastics article with a mold.

FIGS. 1 and 2 illustrate the production of a plastics article that is reinforced with fibers, strands or the like. Said plastics article is a plastics pipe 10 composed of contiguous, interconnected sections of the helically or spirally continuous winding 11. The winding 11 is pultruded as a continuous strand. The winding 11 loops in helical fashion around a longitudinal central axis 12 of the plastics pipe 10. Adjacent annular sections of the winding 11 are connected to one another at their abutting face surfaces 13, 14 by virtue of that section of the winding 11 which is presently being pultruded being placed, in the still-unhardened state, by way of its face surface 13 against the face surface 14 of the previously produced section of the winding 11 and, in the process, the face surfaces 13 and 14 being permanently fixedly connected to one another, by adhesive bonding or fusion, to form the plastics pipe 10.

The face surfaces 13 and 14 by which the individual ring sections of the winding 11 are connected to one another have, in the exemplary embodiment shown, an angled, roof-shaped form. The face surfaces 13 and 14 may however have any other desired forms. They are preferably profiled, though may also be planar.

A device that is used for the continuous pultrusion of the plastics pipe 10 is illustrated partially and schematically in FIGS. 1 and 2. The device has substantially a mold 15, a gripper 16 and a material supply (not illustrated in the figure) for the fabric, strands or fibers that serve for the reinforcement of the plastics pipe 10. The material supply normally has one supply roll for each of the strands, of which there are normally several. The strands are drawn off the supply rolls during the pultrusion of the winding 11 for the production of the plastics pipe 10.

The mold 15 only partially surrounds the winding 11 to be produced, specifically on only three sides in the exemplary embodiment shown, that is to say the face surface 14, the cylindrical outer shell surface 17 and the cylindrical inner shell surface 18. As a result, a groove-like mold cavity 19 which is open on one side is situated in the mold 15. The groove-like mold cavity 19 of the mold 15 is closed by the face surface 14 of the already produced preceding section of the winding 11. In this way, the winding 11 itself contributes, in part, to the formation and shaping of the face surface 13 of that section of the winding 11 which is presently being pultruded. The mold cavity 19 in the mold 15 has a profile which both corresponds to the diameter of the plastics pipe 10 and corresponds to the gradient of the winding 11 for forming the plastics pipe 10. Said gradient corresponds, in one rotation of the winding 11, to the distance between the tips of the face surfaces 13 and 14 as viewed in the cross section of the winding 11.

The groove-like mold cavity 19 has a depth in the direction of the longitudinal central axis 12 of the plastics pipe 10 to be produced, said depth being greater than the length of the profile of the winding 11, specifically of the spacing of the face surfaces 13, 14. As a result, the mold 15 also extends over a part of the previously produced ring of the winding 11, whereby adjacent rings of the winding 11 are guided and centered by the mold 15 during the fusion of their face surfaces 13 and 14 that abut against one another.

The mold 15 extends over a part of the circumference of the plastics pipe 10. In the exemplary embodiment shown, the mold 15 extends over approximately half of the circumference of the plastics pipe 10. Said region may however be larger or smaller depending on the diameter of the plastics pipe 10, on the plastic that is used and on the pultrusion parameters. The strands (not shown), passing from the material supply, for the reinforcement of the plastics pipe 10 enter into the mold 15 at an open entry surface 20. The mold 15 is thus supplied, through the entry surface 20, with the strands for the reinforcement, or else other reinforcement materials such as fibers or the like.

A gripper 16 is arranged in front of an exit surface 22, situated opposite the entry surface 20 in the pultrusion direction 21, of the mold 15. At the exit surface 22, a section of the pultruded winding 11 exits the mold 15 in gradual fashion. Here, the direction in which the winding 11 emerges from the exit surface 22 of the mold 15 is referred to as the pultrusion direction 21. Oriented oppositely to the pultrusion direction 21 is the production direction of the winding 11, specifically the so-called "growth direction" of said winding. The following description will refer to the "pultrusion direction 21". "Front" refers to that side of the mold 32 which is situated in front of the exit surface 22 as viewed in the pultrusion direction 21. Consequently, "rear" refers to that which, as viewed in the pultrusion direction 21, is situated behind the entry surface 20 of the mold 15 at which the strands that serve for the reinforcement of the plastics pipe 10 enter into the mold 15 in the pultrusion direction 21. This point of view or terminology usage also applies to subsequent exemplary embodiments.

The gripper 16 has two opposite gripper parts 23, 24 which are assigned to the outer shell surface 17 and to the inner shell surface 18 of the winding 11. The gripper 16 is designed to be shorter than the mold 15 such that said gripper extends only over a small part of the circumference of a ring or of a turn of the winding 11. The gripper parts 23, 24 can be moved together in order to firmly hold the winding 11 at the outer shell surface 17 and at the inner shell surface 18. For release from the winding 11, the gripper parts 23, 24 can be moved apart. The gripper 16 is dimensioned in the longitudinal direction of the plastics pipe 10 such that it can grip the outer shell surface 17 and the inner shell surface 18 of multiple rotations of the winding 11 when it holds or fixedly clamps the winding 11. Those surfaces of the gripper parts 23 and 24 which come into contact with the outer shell surface 17 and the inner shell surface 18 of the winding 11 are formed correspondingly to the radius of the outer shell surface 17 and inner shell surface 18.

The method for producing the plastics pipe 10 (FIGS. 1 and 2) proceeds as follows:

During the production process, the plastics pipe 10 is rotated about the longitudinal central axis 12 in phases. Here, the strand-like winding 11 of the plastics pipe 10 to be produced is produced in a gradual, specifically preferably stepped, fashion. Here, the plastics pipe 10 is, in sections, rotated out of the mold 15 in the pultrusion direction 21, specifically similarly to a screw being unscrewed from a nut. The mold 15 and the gripper 16 are moved back and forth only periodically in the pultrusion direction 21 and counter to the pultrusion direction 21 about the longitudinal central axis 12 of the plastics pipe 10, wherein, in certain pultrusion phases, a periodic movement of the mold 15 relative to the winding 11 also occurs, specifically counter to the pultrusion direction 21. In another pultrusion phase, the mold 15 and the gripper 16 are advanced, in particular by one step, together with the winding 11 in the pultrusion direction 21. Here, the winding 11 is produced in stepped fashion in the pultrusion direction 21, specifically in the manner of a pilgering process.

When, in the mold 15, that part of the winding 11 which is situated therein has fully or at least partially hardened, said part of the winding 11 is, so to speak, "demolded" by means of a backward movement of the mold 15 counter to the pultrusion direction 21. Here, at least one previously produced part of the winding 11 that has already moved out of the mold 15 is held static by the closed gripper 16. As a result, during the backward movement of the mold 15 counter to the pultrusion direction 21, the mold 15 performs a relative movement with respect to the winding 11, whereby a hardened part of the winding 11 exits the mold 15 at the entry surface 20. During said backward movement of the mold 15 counter to the pultrusion direction 21, strands are drawn off the material supply into the still-empty mold cavity 19 of the mold 15, which strands are then subsequently encased, in the mold 15, with solidified plastic. Furthermore, the mold 15 travels further in the growth direction of the winding 11.

After the backward movement of the mold 15 counter to the pultrusion direction 21, the gripper 16 is opened and subsequently moved backward counter to the pultrusion direction 21 to a point a short distance in front of the exit surface 22 of the mold 15. Subsequently, by virtue of the gripper 16 being closed, the winding 11 is gripped by the gripper 16 again and subsequently the mold 15 and the gripper 16 are moved forward together in the pultrusion direction 21, specifically are rotated about the longitudinal central axis 12 of the plastics pipe 10. Said rotation takes place over a sub-region of the circumference of the plastics pipe 10 which is smaller than the sub-region surrounded by the mold 15 of the plastics pipe 10.

After that section of the winding 11 which is situated in the mold 15 has at least mostly hardened, the above-described process begins again in that, with the winding 11 held static by the gripper 16, the mold 15 is moved backward again counter to the pultrusion direction 21 and, during the resulting relative movement of the mold 15 with respect to the winding 11, which in this phase is not rotated about the longitudinal central axis 12, of the plastics pipe 10, a newly pultruded section of the winding 11 is demolded and the mold 15 is again moved further in the production direction, specifically the growth direction of the winding 11.

The above-described pultrusion method is described in more detail in WO 2008/116560 A1, wherein reference is made to the entire content of said document.

In the above-described method for producing the plastics pipe 10, the cross section of the winding 11 is partially, specifically at the outer shell surface 17, at the inner shell surface 18 and at the face surface 14, formed in the groove-like mold cavity 19 of the mold 15, whereas the face surface 13 is formed by the previously pultruded section of the winding 11, which for this purpose enters partially into the open side of the groove-like mold cavity 19 and closes off the latter. It is thus the case that the mold 15 and another, already previously pultruded part of the winding 11 of the plastics pipe 10 participate in the shaping of the winding 11.

At the start of the production of the plastics pipe 10, when an annular section of the winding 11 that can close off the open side of the groove-like mold cavity 19 of the mold 15 still does not exist, the open side of the mold cavity 19 is closed off by means of an auxiliary profile whose face surface projecting into the mold cavity 19 corresponds to the shape of the face surface 14. Said auxiliary profile is removed when an encircling section of the winding 11 has been pultruded which then—like the subsequent encircling sections of the winding 11 also—contributes together with the mold 15 to the shaping or cross-sectional formation of the winding 11.

FIGS. 3 to 8 show the production of a core in the form of a pipe 25 surrounded by a reinforced plastics article. The pipe may be composed of any desired material. It is also conceivable, instead of the pipe 25, for some other cylindrical article to be provided with the plastics article on the outside. The plastics article is a plastics spiral 26 reinforced with multiple continuous strands 40. The plastics spiral 26 is preferably connected in non-positively locking fashion by means of adhesive bonding or shrinkage, or connected in a frictionally engaging fashion, to the outer cylindrical shell surface 27 of the pipe 25. The plastics spiral 26 surrounds the pipe 25 as an endless winding 28, wherein face surfaces 29 and 30, which are oriented toward one another, of successive turns of the winding are spaced apart from one another. In the exemplary embodiment shown, the face surfaces 29, 30 of successive turns of the winding 28 are spaced apart from one another by a spacer strip 31 arranged in between. Here, the spacer strip 31, which is preferably also endless and wound in spiral fashion, fills the intermediate space between the face surfaces 29, 30 of successive turns of the windings 28 in that opposite sides of the spacer strip 31 bear against the face surface 29 of one turn of the winding 28 and against the face surface 30 of the subsequent turn of the winding 28.

In the exemplary embodiment shown, the cross section of the winding 28 is selected such that the face surfaces 29, 30 are profiled, and specifically in the exemplary embodiment shown have a Z-like profile with two bends. Here, the two face surfaces 29, 30 run parallel to one another. The invention is however also suitable for windings 28 with any other desired cross sections, in particular for face surfaces 29, 30 that are profiled in any other desired way. The face surfaces 29, 30 may optionally also be straight.

To produce the plastics spiral 26 in continuous fashion around the pipe 25 or around some other cylindrical article that serves as a core, use is also made here of a mold 32 and of a gripper 33. The mold 32 surrounds the pipe 25 over a part of the circumference, specifically over approximately half of the circumference in the exemplary embodiment shown. Depending on the production conditions and dimensions of the pipe 25, it is however also possible for the mold 32 to surround a smaller or greater part of the circumference of the pipe 25. The mold 32 has a cavity 34 with which two profile sides of the winding 28, specifically the face surfaces 30 and an outer shell surface 35, can be formed. An opposite, inner shell surface 36 of the profile of the winding 28 is formed by the shell surface 27 of the pipe 25. The opposite face surface 29 of the cross section of the winding 28 is formed by the face surface 30 of the previously produced turn of the winding 28 or by a surface of the spacer strip 31 between the face surfaces 29 and 30 of two successive turns of the winding 28. Thus, not only the mold 32 but also the pipe 25 and a previously produced part of the winding 28 contribute to the formation of the cross-sectional shapes of the winding 28. By virtue of the fact that the face surface 29 of one part of the winding 28 is formed, during the pultrusion, by the face surface 30 of the preceding section of the winding 28 or by the spacer strip 31 bearing against said face surface, the mold 32 is open in the direction of the plastics spiral 26. On the opposite side, for forming the face surface 30 of the winding 28, the mold 32 is sealed off with respect to the shell surface 27 of the pipe.

The gripper 33, which is arranged in front of the mold 32 in the pultrusion direction 37, is designed to abut against a point on the outer shell surface 35 of the already produced plastics spiral 26. The gripper 33 can be pressed against the winding 28 from the outside by a drive (not shown). In the process, that part of the winding 28 which is covered by the gripping surface of the gripper 33 is pressed against the shell surface 27 of the pipe 25. By means of a movement away from the outer shell surface 35 of the winding 28, the gripper 33 releases the winding 28 of the plastics spiral 26 again.

The production of the plastics spiral 26 on the pipe 25 (FIGS. 3 to 8) may basically take place as explained in the above-described exemplary embodiment of FIGS. 1 and 2. It is merely the case here that the pipe 25 also participates in the shaping of the winding 28. Furthermore, at the entry surface 38 for the entry of the strands or fibers into the mold, the spacer strip 31 is fed between adjacent turns of the winding 28 in continuous fashion. If said spacer strip 31 is composed of a material to which the plastic of the winding 28 does not adhere or the outer surfaces of the spacer strip 31 are not of adhesive form or provided with an adhesive coating, the plastics spiral 26 is flexible even though it, together with the spacer strip 31 between the face surfaces 29 and 30 of the winding 28, forms, in effect, a closed ring around the pipe 25.

Figure 3:
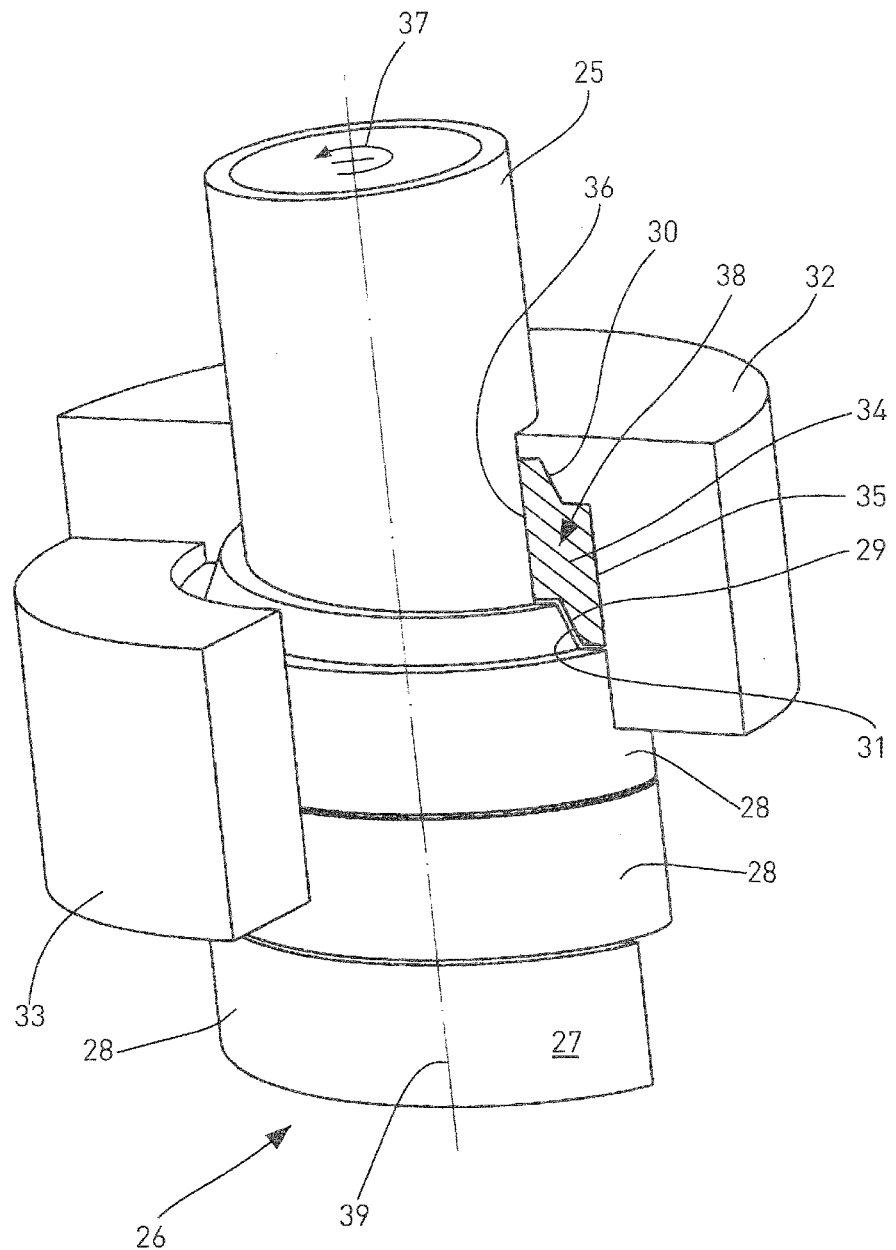
FIG. 3 is a perspective illustration of a device for producing a plastics article in accordance with a method according to a second exemplary embodiment of the invention.
Figure 4:
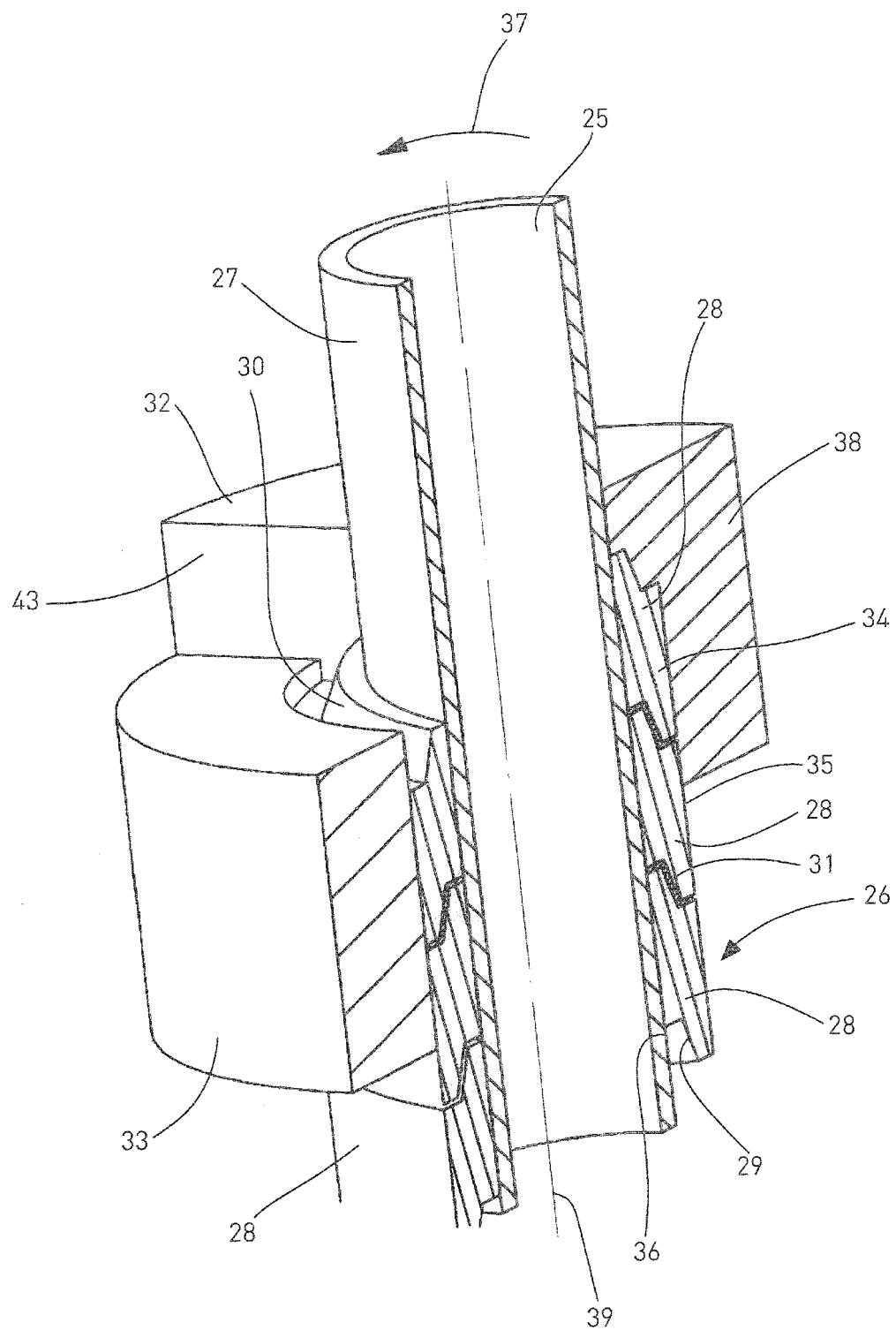
FIG. 4 shows a perspective longitudinal section through the device of FIG. 3.
Figure 5:
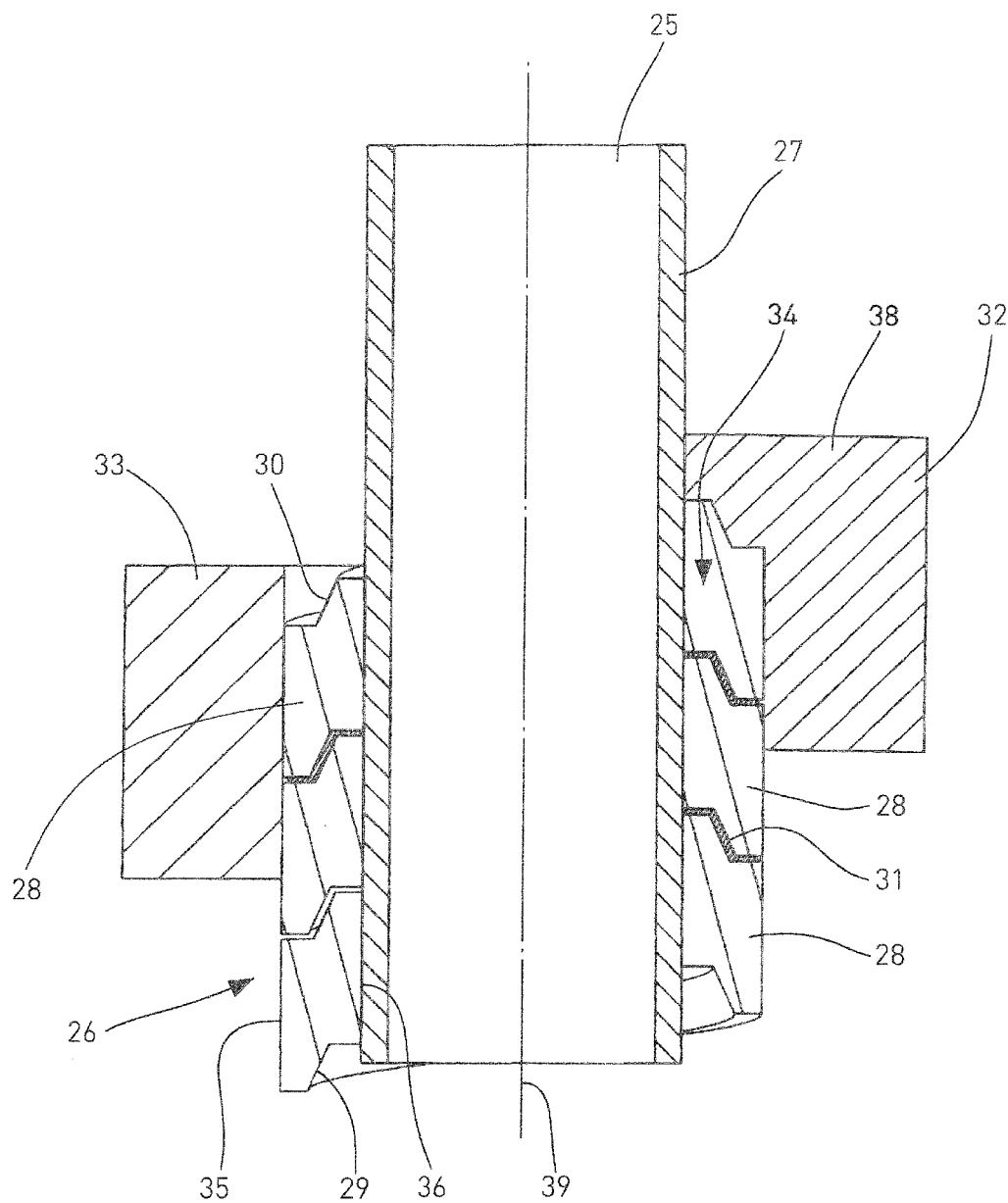
FIG. 5 shows a central longitudinal section through the device of FIGS. 3 and 4.

In an alternative refinement of the invention, it is conceivable for the gripper 33 illustrated in FIGS. 3 to 5 to be coupled to a material supply 41 (not illustrated in the figures), in particular multiple supply rolls for the individual strands 40 that serve for the reinforcement of the plastics spiral 26. Said coupling is realized in such a way that the gripper 33 and the material supply (not shown) are jointly moved periodically around the pipe 25, specifically in stepped fashion. The individual coupled movement steps of the gripper 33 and of the material supply extend in each case only over a part of the circumference of the pipe 25. The mold 32 is also moved periodically around the pipe 25, specifically preferably always to the same extent as the gripper 33 with the material supply 41. However, the mold 32 on the one hand and the gripper with the material supply 41 on the other hand are moved around the static pipe 25 at different times. Owing to the stepped movement of the mold 32 on the one hand and of the gripper 33 with the material supply 41 on the other hand around the pipe 25, the plastics spiral 26 surrounding the pipe 25 is formed without the pipe 25 being moved about its longitudinal central axis 39. Accordingly, in this exemplary embodiment, by contrast to the exemplary embodiments described above, the plastics spiral 26 is not rotated in the manner of a screw out of a nut corresponding to the mold 32, but conversely, the mold 32, as a nut, is rotated onto the screw, the pipe 25. Here, the plastics spiral 26 is produced around the altogether static pipe without the pipe 25 having to be rotated about its longitudinal central axis 39 and having to be moved, correspondingly to the gradient of the winding 28, in the axial direction along the longitudinal central axis 39.

The method for producing the plastics spiral 26 pultruded around the static pipe 25 by means of the mold 32 and gripper 33 with the material supply 41, which are moved around the pipe 25, will be explained below with reference to FIGS. 6 to 8, which schematically show the individual production steps:

The strands 40 or the like that serve for the reinforcement of the plastics spiral 26 are drawn off the material supply 41, which is merely indicated in the illustration. Here, the strands 40 enter the mold 32 via the entry surface 42. The pultruded plastics spiral 26 exits the mold 32 at the exit surface 43. Here, the direction in which the plastics spiral 26 emerges from the exit surface 43 of the mold 32 is again referred to as pultrusion direction 44. Oriented oppositely to the pultrusion direction 44 is the production direction of the plastics spiral 26, the so-called "growth direction".

Figure 6:
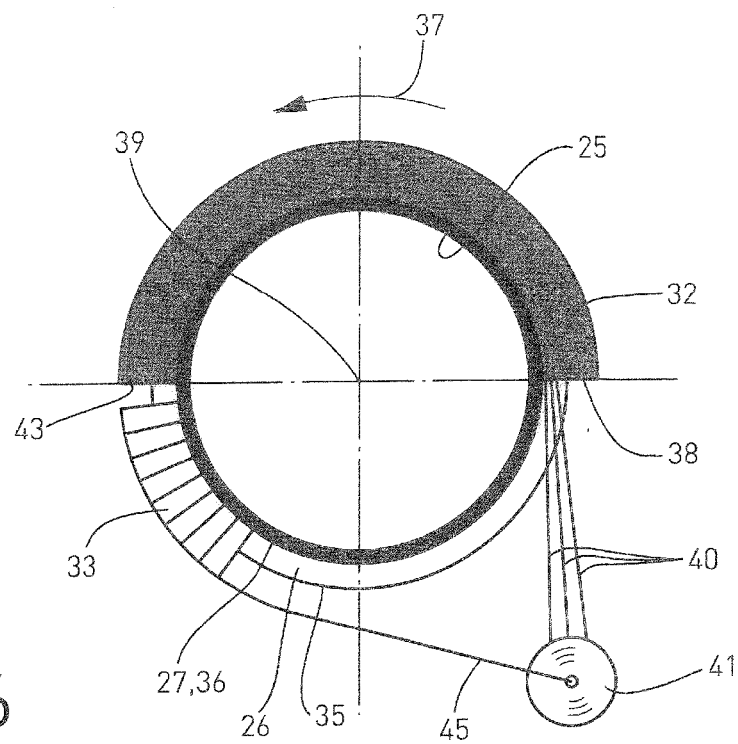
FIG. 6 is a schematic illustration of a first method step.

In the illustration of FIG. 6, the mold 32 and the gripper 33 have been moved together as far as possible. Here, the entry surface 42 for the entry of the material supply 41 into the mold 32 is at a maximum distance from the material supply 41. The strands 40 are encased with plastic in the mold 32. After the plastic has adequately hardened at least in the front part, pointing toward the gripper 33, of the mold 32, the mold 32 is moved backward around the static pipe 25 counter to the pultrusion direction 44, as per FIG. 7. Here, the plastics spiral 26 is held static by the gripper 33, such that the mold performs a relative movement on the plastics spiral 26 counter to the pultrusion direction 44, specifically in the production direction of the plastics spiral 26, specifically in the so-called "growth direction" of the plastics spiral 26. Here, a part of the plastics spiral 26 produced most recently in the mold 32 emerges from the mold at the exit surface 43. This means that said most recently produced part of the plastics spiral 26 exits the mold 32 at the exit surface 43 in the pultrusion direction 44. During the backward movement of the mold 32, new sections of the strands 40 enter the mold 32 through the entry surface 42, wherein the entry surface 42 of the mold 32 moves toward the material supply 41.

In the next step (FIG. 8), the gripper 33, which has been released from the plastics spiral 26, is moved, counter to the pultrusion direction, into a position in front of the exit surface 43 of the mold 32 again. Owing to the connection 45, merely schematically illustrated in FIGS. 6 to 8, of the gripper 33 to the material supply 41, the material supply 41 is driven along by the gripper 33 as the gripper 33 moves toward the mold 32, whereby the material supply 41 moves away from the entry surface 42 of the mold 32 again. The mold 32, the gripper 33 and the material supply 41 have now assumed a position corresponding to that in FIG. 6 again. By contrast to FIG. 6, it is the case in the illustration of FIG. 8 that the mold 32, the gripper 33 and the material supply 41 have moved around a part of the circumference of the static pipe 25. The circular arc path covered by the mold 32, the gripper 33 and the material supply 41 in the production direction or "growth direction" of the plastics spiral 26 corresponds to the newly produced part or region of the plastics spiral 26 produced during one method cycle during the pultrusion of the plastics spiral 26 by the pultrusion steps illustrated in FIGS. 6 to 8.

During the pultrusion of the plastics spiral 26, the spacer strip 31 is fed continuously, specifically, in principle, in the same way as the strands 40. The spacer strip 31 is preferably fed between the face surfaces 29 and 30 of two successive turns of the winding 28 of the mold 32 via the entry surface 38.

Figure 7:
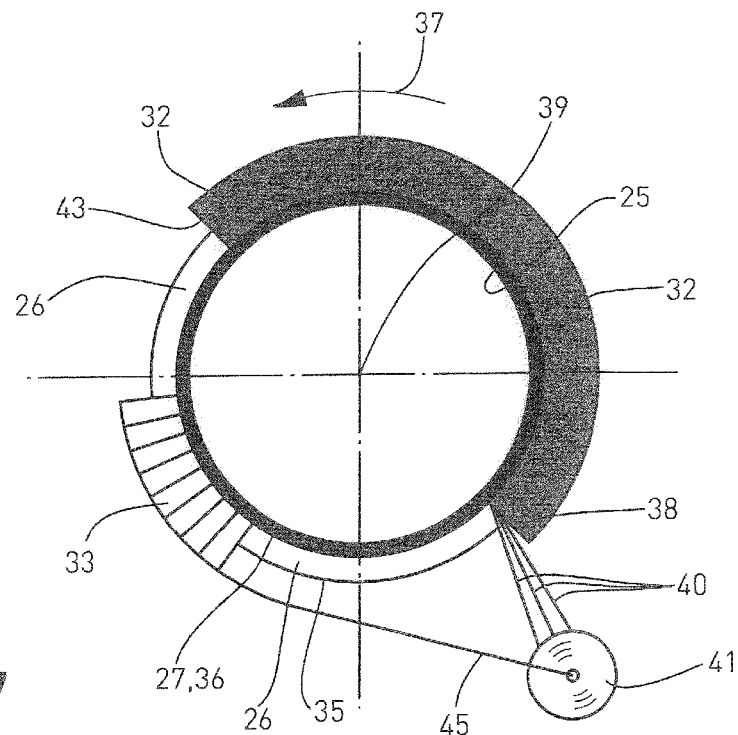
FIG. 7 is a schematic illustration of a subsequent method step.
Figure 8:
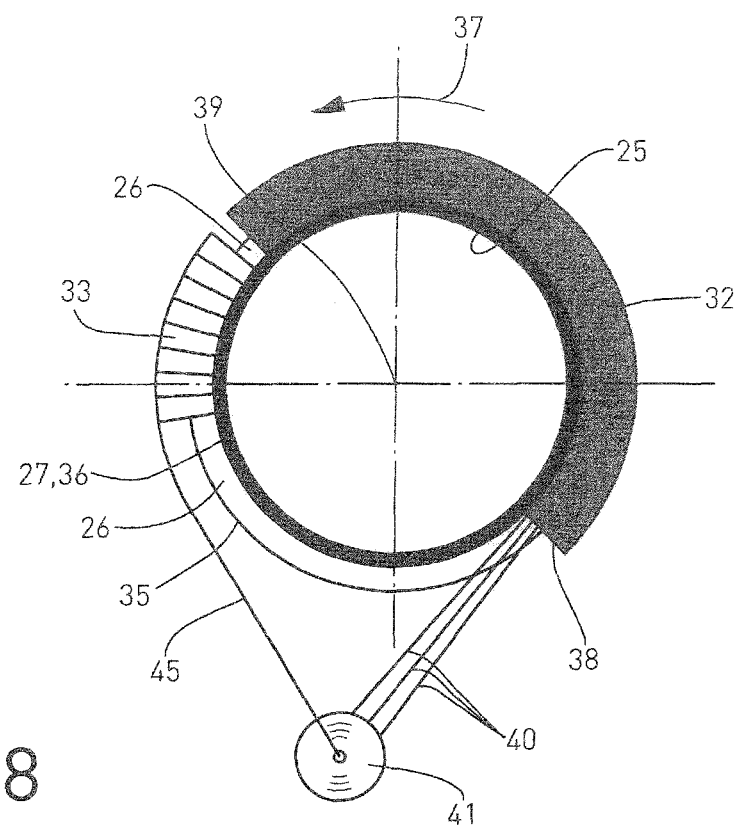
FIG. 8 is a schematic illustration of a further subsequent method step.
Figure 9:
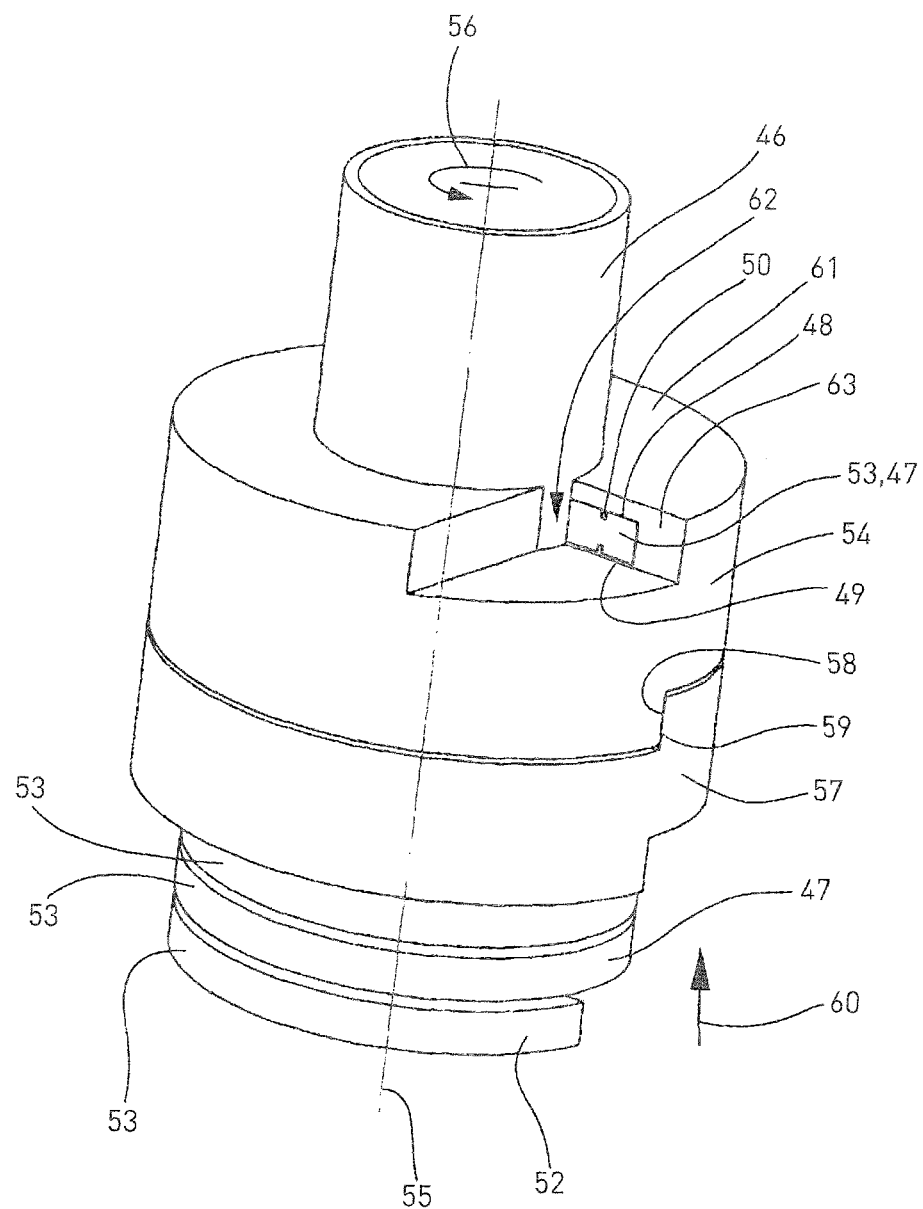
FIG. 9 is a perspective illustration of a device for producing a plastics article according to a further exemplary embodiment of the invention.
Figure 10:
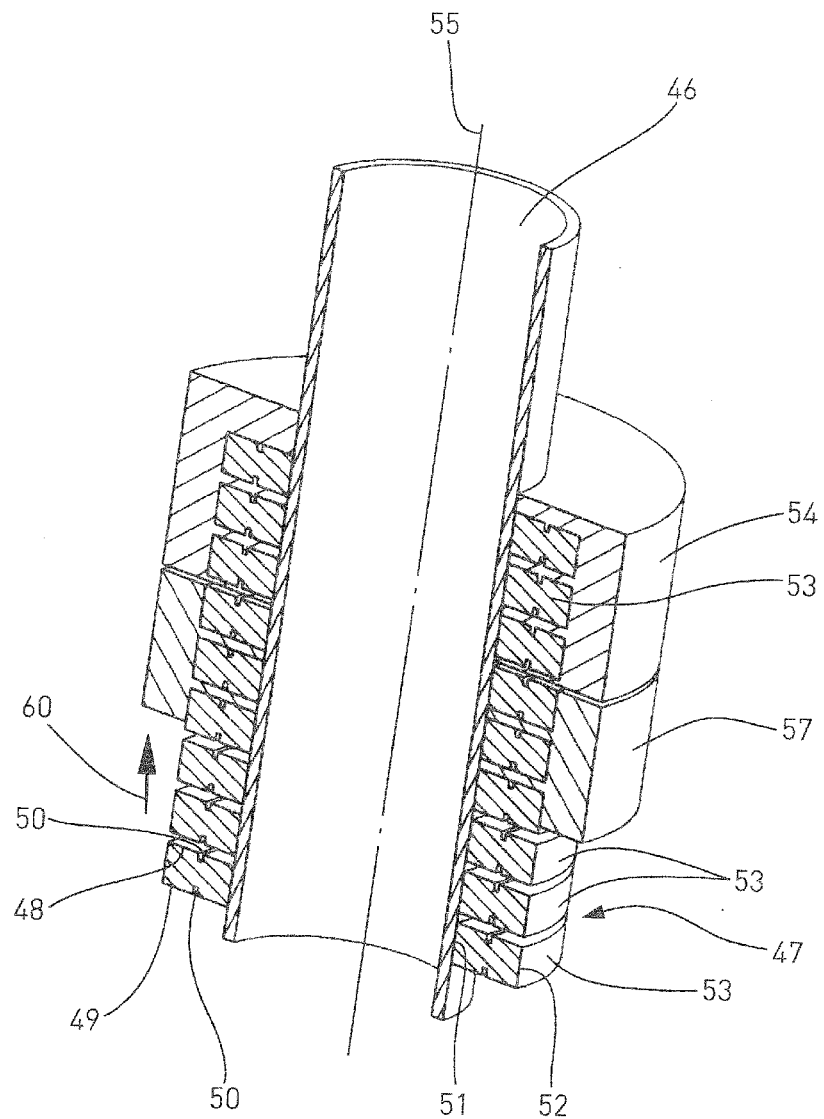
FIG. 10 shows a perspective longitudinal section through the device of FIG. 9.
Figure 11:
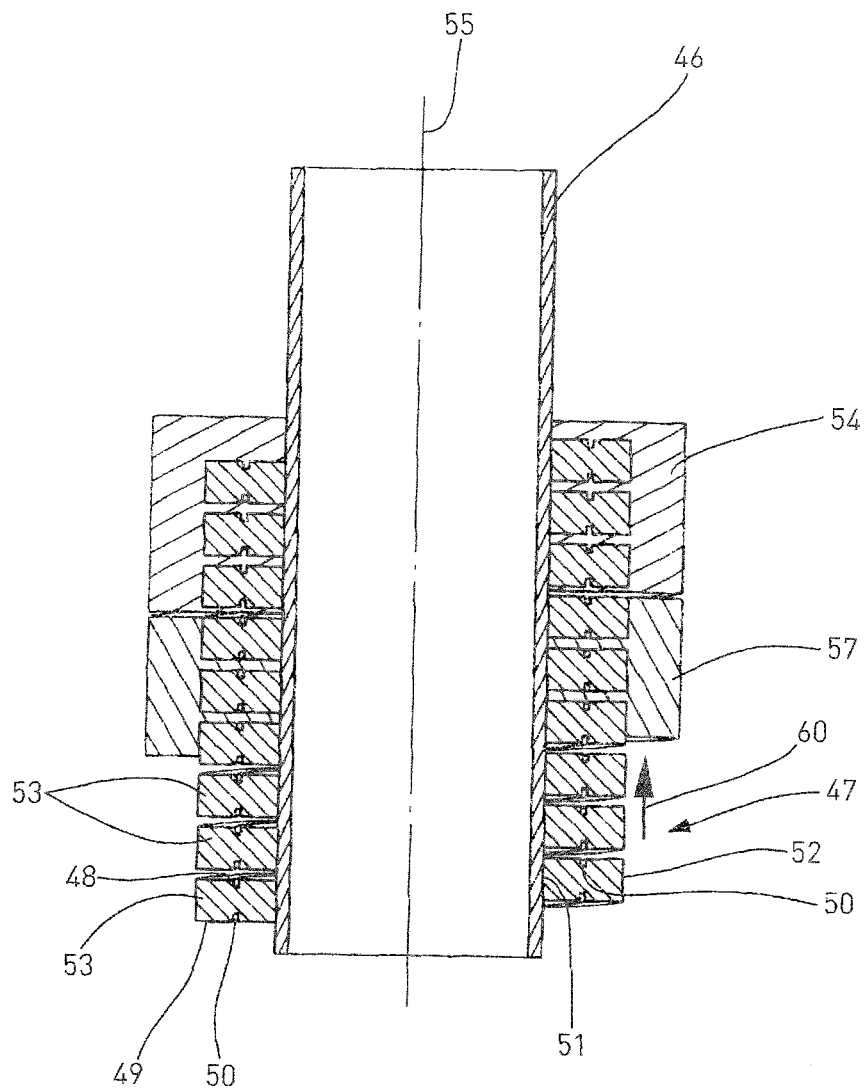
FIG. 11 shows a central longitudinal section through the device of FIGS. 9 and 10 with a plastics article in a partially produced state.

FIGS. 9 to 11 show an exemplary embodiment of the invention which corresponds in principle to that of FIGS. 3 to 8. In this exemplary embodiment, too, a plastics spiral 26 is produced around a pipe 46. In this case, too, the pipe 46 remains static during the production of the plastics spiral 47.

The plastics spiral 47 has spaced-apart turns or rings of a winding 53. The opposite face surfaces 48, 49 of the plastics spiral 47 are profiled. In the exemplary embodiment shown, the face surfaces 48 and 49 are of identical profile, specifically are each provided with a central groove 50. Any other desired designs of the face surfaces 48 and 49 can be produced by means of the exemplary embodiment shown.

A planar inner shell surface 51 of the plastics spiral 47 bears against the pipe 46, which has a smooth cylindrical outer shell. The inner shell surface 51 is connected to the shell surface of the pipe 46. This may be realized by shrink-fitting, sealing and/or adhesive bonding during the production of the plastics spiral 47 around the pipe 46. In the exemplary embodiment shown, an inner shell surface 52 of the plastics spiral 47 is of smooth form. The outer shell surface 52 may however also have any other desired profiles, in particular may be profiled in the same way as the face surfaces 48 and 49.

The plastics spiral 47 that is shown is flexible, in particular owing to its spaced-apart windings 53, such that it does not significantly impair the bending characteristics of the encased pipe 46, or some other cylindrical article, that serves as a core. For the pultrusion of the plastics spiral 47 that is reinforced with strands (not shown in FIGS. 9 to 11), use is made of a mold 54 which completely surrounds the pipe 46 and which extends over the pipe 46 along a longitudinal central axis to such an extent that the mold 54 engages over multiple turns of the winding 53 of the plastics spiral 47. In the pultrusion direction 56, that is to say the direction in which a newly pultruded section of the plastics spiral 47 is pushed out or ejected from the mold 54 in stepped fashion, the mold 54 is followed by a gripper 57 which, like the mold 54, completely surrounds the pipe 46, specifically also covering multiple turns of the winding 53 of the plastics spiral 47. When the gripper 57 has been moved into contact with the mold 54, it is the case in the exemplary embodiment shown that an exit surface 58 of the mold 54 bears against a starting surface 59 of the gripper 57 (FIG. 9).

The mold 54 has a cutout 62 in a cylindrical surface 61 which is situated at the front in a gradient direction 60 of the plastics spiral 47. A surface of the cutout 62 running in an approximately radial orientation with respect to the pipe 46 surrounds an entry surface 63 for the entry of the strands, which serve for reinforcement, into the mold 54 (FIG. 9). The strands, fibers or the like that serve for reinforcement can enter the mold 54, from a material supply which is not shown in FIGS. 9 to 11, through the entry surface 63. In this exemplary embodiment, too, the at least one material supply (not shown) for, in particular, multiple strands is connected to the gripper 57 such that the two form a unit and are jointly movable.

The method for the pultrusion of the plastics spiral 47 on the pipe 46 proceeds, in principle, in the same way as in the preceding exemplary embodiment (FIGS. 6 to 8). Accordingly, the mold 54 and the gripper 57 with the material supply are moved around the, in this case, static pipe 46 during the pultrusion of the plastics spiral 47, wherein, as the production of the plastics spiral 47 progresses, the mold 54 and the gripper 57 with the material supply rotate in spiral fashion around the pipe 46 counter to the pultrusion direction 56, that is to say in the "growth direction" of the plastics spiral 47, and, in the process, perform an upward (ascending in the views in FIGS. 10 and 11) screw-type movement in the longitudinal direction of the pipe 46 and gradient direction of the plastics spiral 47.

Here, too, the mold 54 is rotated clockwise about the pipe 46 in stepped fashion through a certain angle range, wherein a newly pultruded section of the plastics spiral 47 emerges from the exit surface 58 of the mold 54 rearward, so to speak, in the pultrusion direction 56. Here, the mold 54 travels onward on the pipe 46 in helical fashion in the production direction, specifically the "growth direction" of the plastics spiral 47. After a new piece of pultruded plastics spiral 47 has been demolded from the mold 54 with the plastics spiral 47 being held by the gripper 57, it is provided that, analogously to the illustration in FIG. 7, the gripper 57, which has been released again from the plastics spiral 47, is moved, together with the material supply, behind the mold 54 again, specifically by being rotated about the longitudinal central axis 55 of the pipe 56. Subsequently, the mold 54 on its own is again moved onward in the production direction or "growth direction" of the plastics spiral 47 with the gripper 57 closed, and then the opened gripper 57 together with the material supply then performs, so to speak, a follow-up movement.

Because it is the case in the exemplary embodiment shown that both the mold 54 and also the gripper 57 completely surround the pipe 46 and furthermore extend over multiple windings 53 of the plastics spiral 47, it is possible for every production step, specifically rotation firstly of the mold 54 relative to the plastics spiral 47, which in this case is held static by the gripper 57, and secondly of the gripper 57 together with the material supply, to be larger than in the above-described exemplary embodiment of FIGS. 6 to 8. One full rotation of the mold 54 and subsequently of the gripper 57 with the material supply about the longitudinal axis 55 of the pipe 46, and possibly even more than one rotation, would be conceivable.

In a further exemplary embodiment of the invention (not shown), the exemplary embodiment of FIGS. 9 to 11 is modified such that the mold 54 and the gripper 57 do not extend as far as the pipe 46 between successive rings or turns of the winding 53, but rather end with a spacing to the outer shell surface of the pipe 46. In this way, the pipe 46 is surrounded by a continuous plastics outer wall, wherein the plastics spiral 47 is formed integrally on the outside of the plastics outer wall. By means of a corresponding thickness of the outer wall that completely surrounds the pipe 46, the flexibility of the plastics spiral 47 with the plastics wall completely surrounding the pipe 46 can be varied as desired. By means of the albeit only thin outer plastics wall, the pipe 46 is completely coated with plastic, specifically even between the turns of the winding 53. This results in a pipe 46 that is completely protected against external influences, or some other article that is surrounded by the plastics spiral 47 with continuous inner plastics pipe or hose.

LIST OF REFERENCE NUMERALS

10 Plastics pipe
11 Winding
12 Longitudinal central axis
13 Face surface
14 Face surface
15 Mold
16 Gripper
17 Outer shell surface
18 Inner shell surface
19 Mold cavity
20 Entry surface 21 Pultrusion direction
22 Exit surface
23 Gripper part
24 Gripper part
25 Pipe
26 Plastics spiral
27 Shell surface
28 Winding
29 Face surface
30 Face surface
31 Spacer strip
32 Mold
33 Gripper
34 Cavity
35 Outer shell surface
36 Inner shell surface
37 Pultrusion direction
38 Entry surface
39 Longitudinal central axis
40 Strand
41 Material supply
42 Entry surface
43 Exit surface
44 Pultrusion direction
45 Connection
46 Pipe
47 Plastics spiral
48 Face surface
49 Face surface
50 Groove
51 Inner shell surface
52 Outer shell surface
53 Winding
54 Mold
55 Longitudinal central axis
56 Pultrusion direction
57 Gripper
58 Exit surface
59 Starting surface
60 Gradient direction
61 Front surface
62 Cutout
63 Entry surface

What is claimed is:

1. A method for producing a reinforced plastics article, wherein a continuous reinforcement composed of strands (40) and/or fabric is guided through a mold (15) and, in the mold (15), is embedded in plastic to form the plastics article, and the mold (15) is periodically moved relative to the plastics article, wherein a part of the plastics article contributes, together with the mold (15), to the formation of the plastics article, wherein a pipe-shaped plastics article (10) is formed from multiple windings (11) lined up in coiled or spiral fashion, and wherein an already formed preceding winding (11) serves, together with the mold (15), for forming a subsequent winding.

2. The method as claimed in claim 1, wherein the subsequent winding of the plastics article is joined in continuous fashion to the preceding winding (11) of the same plastics article.

3. The method as claimed in claim 1, wherein the mold (15) performs a relative movement on a part of the preceding winding (11) and of the subsequent winding of the plastics article.

4. The method as claimed in claim 1, wherein an axis of the spiral-shaped windings (11) coincides with a longitudinal central axis (12) of the pipe-shaped plastics article (10).

5. The method as claimed in claim 1, wherein the plastics article is moved relative to a material supply.

6. The method as claimed in claim 1, wherein the mold (15) is moved back and forth in discontinuous or stepped fashion, wherein, during a backward movement of the mold (15) counter to a pultrusion direction (21), the mold (15) performs a relative movement with respect to the plastics article.

7. The method as claimed in claim 1, wherein the plastics article is static.

8. A method for producing a reinforced plastics article, wherein a continuous reinforcement composed of strands (40) and/or fabric is guided from a material supply (41) through a mold (32, 54) and, in the mold (32, 54), is embedded in plastic to form the plastics article, the mold (32, 54) is periodically moved relative to the plastics article and a gripper (33, 57) is periodically moved on the plastics article relative to the mold (32, 54), wherein the mold (32, 54), the gripper (33, 57) and the material supply (41) are moved periodically around a shell surface of a cylindrical core, wherein the gripper (33, 57) and the material supply (41) are moved jointly, in a fixed relationship, periodically around the shell surface.

9. The method as claimed in claim 8, wherein a spiral-shaped plastics article with windings (28, 53) that is produced around the cylindrical core.

10. The method as claimed in claim 9, wherein the windings (28, 53) of the plastics article are produced by the mold (32, 54) and by the shell surface of the cylindrical core.

11. The method as claimed in claim 9, wherein a spacer strip (31) is inserted between the windings (28).

12. The method as claimed in claim 11, wherein the spacer strip (31) is inserted in a continuous fashion between the windings (28).

13. The method as claimed in claim 9, wherein the mold (15, 32, 54) is moved on and along the profile of the winding (11, 28, 53) of the plastics article, and the plastics article or the winding (11, 28, 53) is held static during the movement of the mold (15, 32, 54).

14. The method as claimed in claim 9, wherein the windings (28, 53) are spaced apart from one another.

15. The method as claimed in claim 9, wherein the cylindrical core is static.

16. The method as claimed in claim 8, wherein the mold (32, 54), the gripper (33, 57) and the material supply (41) move on a spiral path around the shell surface of the cylindrical core.

17. The method as claimed in claim 16, wherein the gripper (33, 57) and the material supply (41) are moved jointly in stepped fashion relative to the mold (32, 54) and the cylindrical core on the spiral path, and/or the relative spacing between the gripper and the material supply is kept constant by way of joint movement or simultaneous stopping.

18. The method as claimed in claim 8, wherein the gripper (33, 57) is arranged directly in front of the mold (32, 54) on the plastics article as viewed in a pultrusion direction (37, 56) of the plastics article, wherein the spacing between the gripper (33, 57) and the mold (32, 54) is varied by means of alternating movement of the mold (32, 54) or of the gripper (33, 57) with the material supply (41).

19. The method as claimed in claim 18, wherein the alternating movement of the mold (32, 54) is periodic.

20. The method as claimed in claim 8, wherein, for the demolding or ejection of a newly produced section of the plastics article, the mold (15, 32, 54) is moved back a certain distance counter to a pultrusion direction (21, 37, 56) on the plastics article which in this case is held static, whereby gradually, in each working stroke, a piece of the plastics article emerges from the mold (15, 32, 54) in the pultrusion direction (21, 37, 56).

21. The method as claimed in claim 8, wherein the plastics article is held static by the gripper (16, 33, 57) during the movement of the mold (15, 32, 54) along the plastics article, which is static relative to said mold.

* * * * *